(12) United States Patent
Ye et al.

(10) Patent No.: US 10,057,885 B2
(45) Date of Patent: Aug. 21, 2018

(54) DEVICE AND METHOD OF HANDLING TRANSMISSION IN UNLICENSED BAND

(71) Applicant: HTC Corporation, Taoyuan (TW)

(72) Inventors: Shiang-Rung Ye, Taoyuan (TW);
Chih-Yao Wu, Taoyuan (TW);
Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 152 days.

(21) Appl. No.: 14/862,160

(22) Filed: Sep. 23, 2015

(65) Prior Publication Data

US 2016/0095101 A1    Mar. 31, 2016

Related U.S. Application Data

(60) Provisional application No. 62/055,668, filed on Sep. 26, 2014.

(51) Int. Cl.
| | |
|---|---|
| *H04W 72/04* | (2009.01) |
| *H04L 1/18* | (2006.01) |
| *H04L 5/00* | (2006.01) |

(52) U.S. Cl.
CPC ....... *H04W 72/0406* (2013.01); *H04L 1/1812* (2013.01); *H04L 1/1854* (2013.01); *H04L 5/0055* (2013.01); *H04L 5/001* (2013.01)

(58) Field of Classification Search
CPC ...... H04W 72/04; H04W 88/08; H04W 76/00
See application file for complete search history.

(56) References Cited

U.S. PATENT DOCUMENTS

| | | | |
|---|---|---|---|
| 9,544,885 B2 * | 1/2017 | You | H04J 11/00 |
| 2011/0243047 A1 | 10/2011 | Dayal | |
| 2012/0269180 A1 | 10/2012 | Li | |

(Continued)

FOREIGN PATENT DOCUMENTS

| | | |
|---|---|---|
| CN | 102165727 A | 8/2011 |
| CN | 103368710 A | 10/2013 |

(Continued)

OTHER PUBLICATIONS

Office Action dated Oct. 18, 2016 for the Japanese Application No. 2015-188158, filing date Sep. 25, 2015, pp. 1-7.
European Search report dated Jan. 26, 2016 for EP application No. 15186851.0.
HTC, "Multiplexing between UL HARQ-ACK and D2D signals", 3GPP TSG RAN WG1 Meeting #78 , R1-143033, Aug. 18-22, 2014, Dresden, Germany, XP050788512, pp. 1-4.

(Continued)

*Primary Examiner* — Hassan Phillips
*Assistant Examiner* — Prenell Jones
(74) *Attorney, Agent, or Firm* — Winston Hsu

(57) ABSTRACT

A communication device for handling a transmission in an unlicensed band comprises a storage unit for storing instructions and a processing means coupled to the storage unit. The processing means is configured to execute the instructions stored in the storage unit. The instructions comprise performing a first transmission using a hybrid automatic repeat request (HARQ) process in a first subframe of an unlicensed band to a network; receiving a first DCI for the HARQ process in a first control channel in a second subframe of the unlicensed band in response to the first transmission from the network, wherein a distance between the first subframe and the second subframe greater than four subframes; and performing a second transmission using the HARQ process in a third subframe of the unlicensed band to the network according to the first DCI.

16 Claims, 10 Drawing Sheets

(56) References Cited

U.S. PATENT DOCUMENTS

2012/0300751 A1* 11/2012 Arai ................ H04L 5/0053
370/336
2013/0201884 A1* 8/2013 Freda ................ H04W 72/005
370/278
2014/0036889 A1 2/2014 Kim

FOREIGN PATENT DOCUMENTS

| | | |
|---|---|---|
| CN | 103370896 A | 10/2013 |
| EP | 2 613 471 A2 | 7/2013 |
| EP | 2690815 A2 | 1/2014 |
| JP | 2012504913 A | 2/2012 |
| JP | 2013524642 A | 6/2013 |
| JP | 2014500685 A | 1/2014 |
| JP | 2014513462 A | 5/2014 |

OTHER PUBLICATIONS

3GPP TS 36.321 V12.3.0 (Sep. 2014) Technical Specification 3rd Generation Partnership Project; Technical Specification Group Radio Access Network; Evolved Universal Terrestrial Radio Access (E-UTRA); Medium Access Control (MAC) protocol specification (Release 12).

3GPP TSG RAN Meeting #65, RP-141664, Edinburgh, Scotland, Sep. 9-12, 2014, revision of RP-141646, Source: Ericsson, Qualcomm, Huawei, Alcatel-Lucent, Title:Study on Licensed-Assisted Access using LTE, Document for:Approval, Agenda Item:14.1.1.

Office action dated Mar. 16, 2018 for the China application No. 201510622085.1, filed Sep. 25, 2015, p. 1-6.

* cited by examiner

DEVICE AND METHOD OF HANDLING TRANSMISSION IN UNLICENSED BAND

CROSS REFERENCE TO RELATED APPLICATIONS

This application claims the benefit of U.S. Provisional Application No. 62/055,668, filed on Sep. 26, 2014 and incorporated herein by reference.

BACKGROUND OF THE INVENTION

1. Field of the Invention

The present invention relates to a method used in a wireless communication system and related communication device, and more particularly, to a method of handling a transmission in an unlicensed band and related communication device.

2. Description of the Prior Art

A long-term evolution (LTE) system is developed by 3rd Generation Partnership Project (3GPP) to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs). A LTE-advanced (LTE-A) system, as its name implies, is an evolution of the LTE system. The LTE-A system increases peak data rate and throughput, and includes advanced techniques, such as carrier aggregation (CA), licensed-assisted access (LAA) using LTE, etc.

Network operators propose to offload network traffic of the LTE/LTE-A system to an unlicensed band, to ease load of the network traffic. For example, the eNB provides services to a UE via the unlicensed band. However, the UE is not able to receive a HARQ feedback at a time instant in the unlicensed band, because resources in the unlicensed band are not available at the time instant for the eNB to transmit the HARQ feedback on a carrier of the unlicensed band due to that the carrier is busy or occupied. That is, the operation of the UE in the unlicensed band may not be performed regularly due to the uncertainty of the resources in the unlicensed band. Correspondingly, the eNB cannot receive a new transmission or a retransmission at a time instant corresponding to the HARQ feedback in the unlicensed band because the UE is not able to transmit the new transmission or the retransmission on a carrier of the unlicensed band at the time instant due to that the carrier is busy or occupied, and the operation of the eNB is also affected.

Thus, how to solve the transmission/reception of the HARQ feedback and the corresponding (re)transmission in the unlicensed band is an important problem to be solved.

SUMMARY OF THE INVENTION

The present invention therefore provides a method and related communication device for handling a transmission in an unlicensed band to solve the abovementioned problem.

A communication device for handling a transmission in an unlicensed band comprises a storage unit for storing instructions and a processing means coupled to the storage unit. The processing means is configured to execute the instructions stored in the storage unit. The instructions comprise performing a first transmission using a hybrid automatic repeat request (HARQ) process in a first subframe of an unlicensed band to a network; receiving a first DCI for the HARQ process in a first control channel in a second subframe of the unlicensed band in response to the first transmission from the network, wherein a distance between the first subframe and the second subframe greater than four subframes; and performing a second transmission using the HARQ process in a third subframe of the unlicensed band to the network according to the first DCI.

A communication device for stopping a retransmission comprises a storage unit for storing instructions and a processing means coupled to the storage unit. The processing means is configured to execute the instructions stored in the storage unit. The instructions comprise performing a reception from a communication device in a first subframe; transmitting an acknowledgement (ACK) in a second subframe to the communication device to stop a retransmission, if the network does not detect the reception successfully; and transmitting a DCI in a control channel in a third subframe to the communication device, wherein the DCI indicates the communication device to perform the retransmission.

A communication device for recognizing a downlink (DL) control information (DCI) comprises a storage unit for storing instructions and a processing means coupled to the storage unit. The processing means is configured to execute the instructions stored in the storage unit. The instructions comprise performing a transmission in a first subframe to a network; receiving a downlink (DL) control information (DCI) comprising an indicator in a control channel in a second subframe from the network in response to the transmission; and determining whether the transmission is successful according to the indicator.

A communication device for receiving a physical downlink (DL) control channel (PDCCH) in an unlicensed band comprises a storage unit for storing instructions and a processing means coupled to the storage unit. The processing means is configured to execute the instructions stored in the storage unit. The instructions comprise resetting a value of a counter for a hybrid automatic repeat request (HARQ) process, when the communication device receives a PDCCH in a first subframe scheduled for the HARQ process and the PDCCH requests a new uplink (UL) transmission; increasing the value of the counter, when the communication device does not receive the PDCCH in a second subframe scheduled for the HARQ process; and stopping receiving the PDCCH, when the counter reaches a value or when a medium access control (MAC) layer of the communication device is reset.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
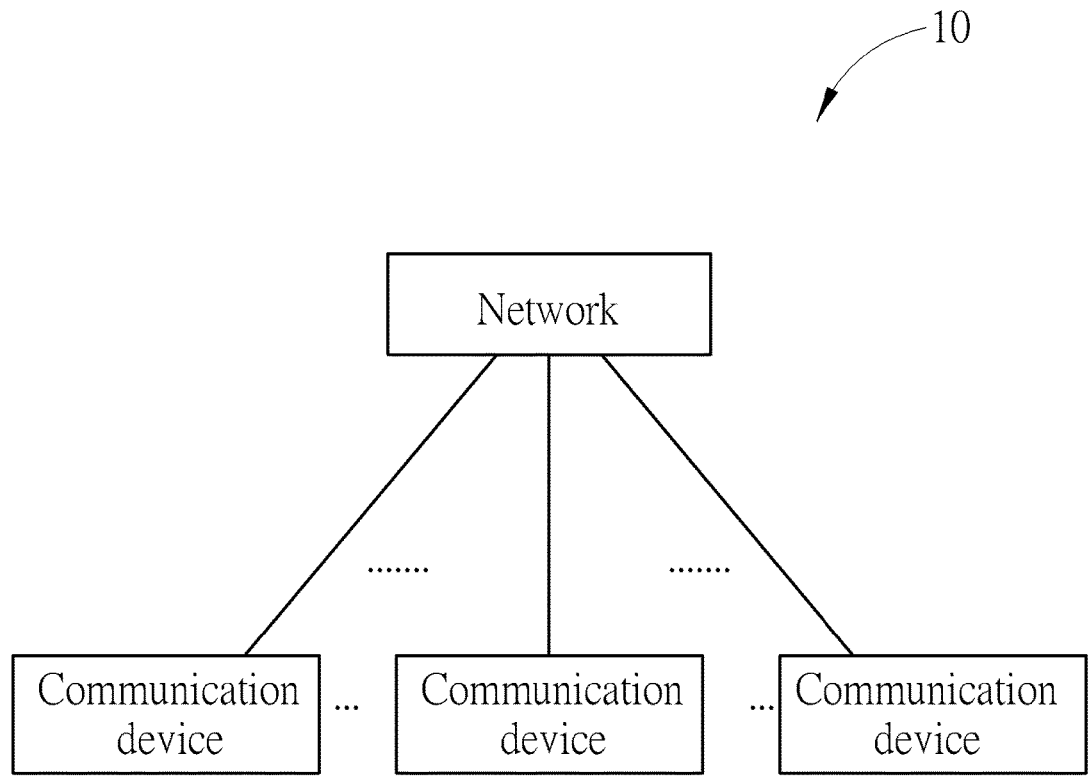
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. The network and a communication device may communicate with each other via one or more carriers of licensed band (s) and/or unlicensed band (s). The network and the communication device may simultaneously communicate with each other via multiple cells (e.g., multiple carriers) including a primary cell (e.g., primary component carrier) and one or more secondary cells (e.g., secondary component carriers). The abovementioned cells may be operated in the same or different duplexing modes, i.e. frequency-division duplexing (FDD) and time-division duplexing (TDD). For example, the primary cell may be operated on licensed carrier (s), while the secondary cell may be operated on unlicensed carrier (s).

In FIG. 1, the network and the communication devices are simply utilized for illustrating the structure of the wireless communication system 10. Practically, the network may be an evolved UTRAN (E-UTRAN) including at least one evolved NB (eNB) and/or at least one relay in a long term evolution (LTE) system, a LTE-Advanced (LTE-A) system or an evolution of the LTE-A system. The eNB or the relay may be termed as a base station.

A communication device may be a user equipment (UE), a low cost device (e.g., machine type communication (MTC) device), a device-to-device (D2D) device, a mobile phone, a laptop, a tablet computer, an electronic book, a portable computer system, a vehicle, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
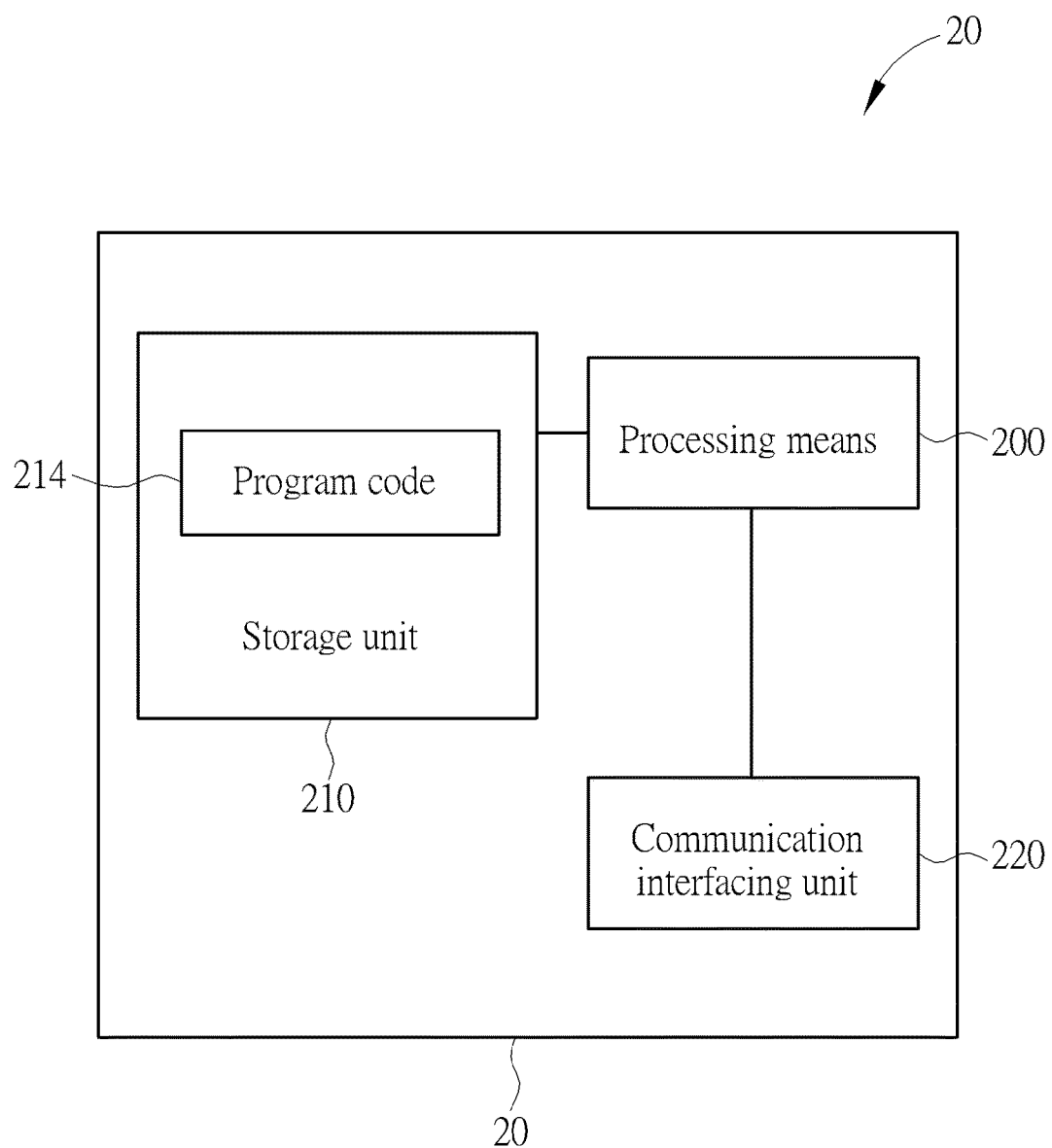
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200. For the sake of simplicity, UE is taken as an example of the communication device in the following embodiments. It should be noted that the scope of the invention is not limited thereto.

Figure 3:
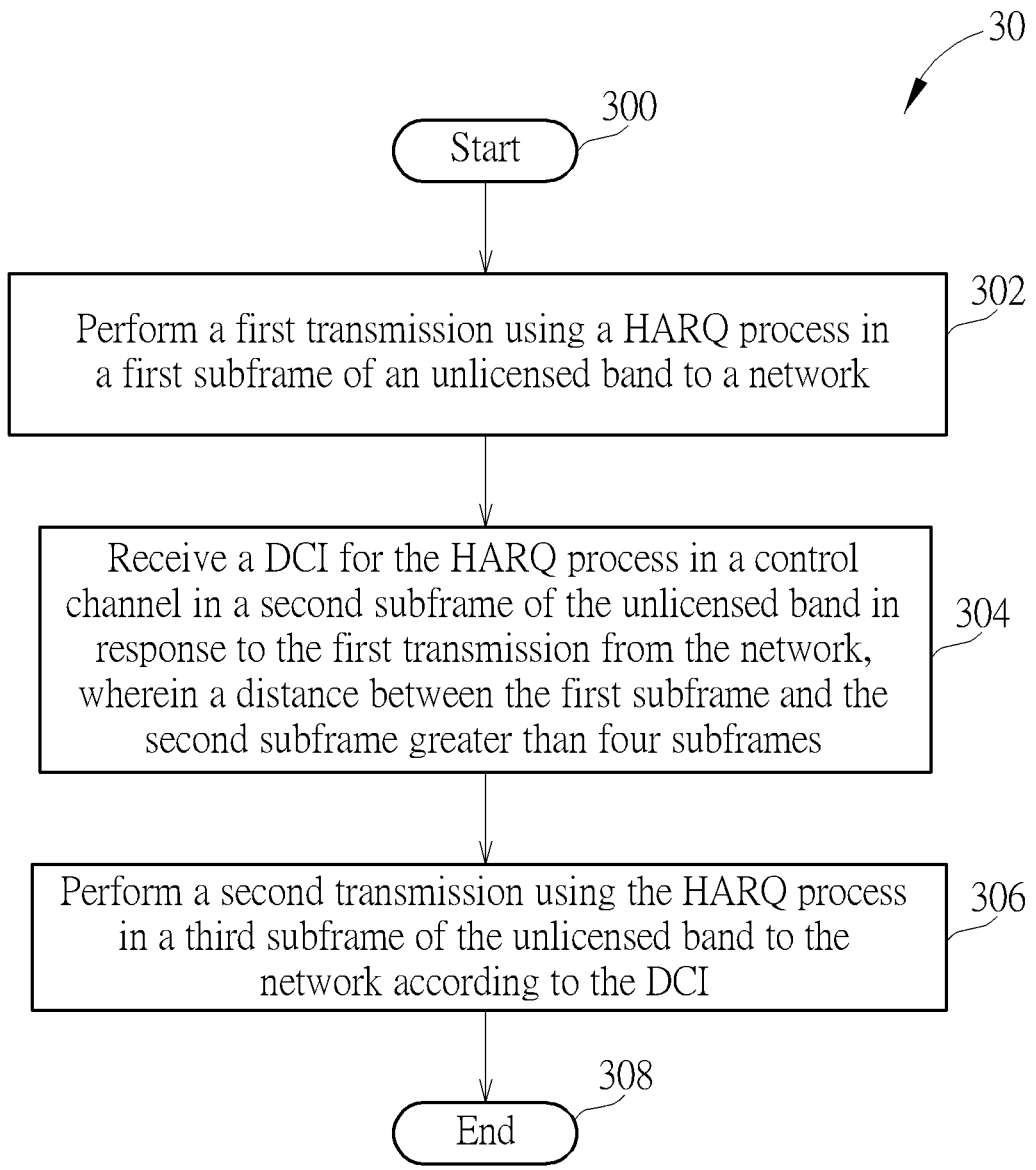
FIG. 3 is a flowchart of a process according to an example of the present invention.

FIG. 3 is a flowchart of a process 30 according to an example of the present invention. The process 30 may be utilized in a UE shown in FIG. 1, to handle a transmission in an unlicensed band. The process 30 may be compiled into the program code 214 and includes the following steps:

Step 300: Start.

Step 302: Perform a first transmission using a hybrid automatic repeat request (HARQ) process in a first subframe of an unlicensed band to a network.

Step 304: Receive a DCI for the HARQ process in a control channel in a second subframe of the unlicensed band in response to the first transmission from the network, wherein a distance between the first subframe and the second subframe greater than four subframes.

Step 306: Perform a second transmission using the HARQ process in a third subframe of the unlicensed band to the network according to the DCI.

Step 308: End.

According to the process 30, the UE may perform a first transmission (e.g., a packet) using a HARQ process in a first subframe (e.g., on a first carrier) of an unlicensed band to a network. Then, the UE may receive a DCI for (e.g., using) the HARQ process in a control channel in a second subframe (e.g., on a second carrier) of the unlicensed band in response to the first transmission from the network, wherein a distance between the first subframe and the second subframe greater than four subframes. Accordingly, the UE may perform a second transmission using the HARQ process in a third subframe (e.g., on the first carrier) of the unlicensed band to the network according to the DCI. Note that the second transmission may be a retransmission or a new transmission for the HARQ process. That is, the UE may receive a DCI in a subframe (n+k) (where k>4, e.g., k=7) in response to a transmission of a HARQ process, after the transmission of the HARQ process is performed in a subframe n, i.e., the original (n+4) rule is not used. Then, a retransmission (or a new transmission) of the HARQ process may be performed in a subframe (n+k+4). The first carrier and the second carrier may be same or different. Thus, the uncertainty of the unlicensed band can be overcome.

In one example, the DCI in the process 30 may include a HARQ process identification (ID) for identifying the HARQ process for performing the first transmission and the second transmission. Further, the HARQ process ID may be indicated by a field of the DCI with a new UL DCI format, or may be indicated by at least one bit of the DCI with an existent DCI format. In one example, the DCI may include a new data indicator (NDI) for indicating that the second transmission is a new transmission or is a retransmission corresponding to the first transmission. In one example, the DCI may include a UL grant for indicating a resource for performing the second transmission. That is, the HARQ process ID, the NDI and/or the UL grant may be included in the DCI for the UE to perform the second transmission. Because of the DCI, the network does not transmit a HARQ feedback in a HARQ feedback channel (e.g., physical hybrid ARQ indicator channel (PHICH)) to acknowledge or negatively acknowledge a transmission received on an unlicensed carrier of the unlicensed band by the network. In other words, the UE is not configured to receive the HARQ feedback for the transmission of the unlicensed carrier.

In one example, the distance may be dynamically determined by the network. The network may determine the distance according to a listen-before-talk (LBT) result. That is, the network determines the subframe where the DCI is transmitted on a carrier of the unlicensed band, when the network detects the carrier is not busy or not occupied. A maximum value of the distance in the process 30 may be configured by the network (e.g., via a signalling), may be a predetermined value (e.g., specified in the 3GPP standard), and is not limited. In one example, the control channel may include (or simply be) a physical DL control channel (PDCCH) or an enhanced PDCCH (EPDCCH). That is, the UE may receive the DCI in any of the control channels of the second subframe. In one example, the first transmission may be performed via a physical UL shared channel (PUSCH) of the first subframe, and the second transmission is performed via a PUSCH of the third subframe. That is, the (re) transmissions mentioned above may be packets transmitted via the PUCSCH.

In one example, the UE may further perform a third transmission using another HARQ process in a fourth subframe (e.g., on a third carrier) of a licensed band to the network. Then, the UE may receive another DCI for the other HARQ process in another control channel (e.g., PDCCH or EPDCCH) in a fifth subframe (e.g., on a fourth carrier) of the licensed band from the network in response to the third transmission, wherein a distance between the fourth subframe and the fifth subframe is four subframes. The third carrier and the fourth carrier may be same or different. The other DCI may not include a HARQ process ID for identifying the other HARQ process. Alternatively, the UE may receive a negative acknowledgement in a HARQ feedback channel in the fifth subframe of the licensed band from the network in response to the third transmission, wherein the distance between the fourth subframe and the fifth subframe is four subframes. Accordingly, the UE may perform a fourth transmission for the other HARQ process using the other HARQ process in a sixth subframe (e.g., on the third carrier) of the licensed band to the network according to the other DCI or the negative acknowledgement. That is, the UE may receive the other DCI or the negative acknowledgement in a subframe (n+4) in response to a transmission after the transmission is performed in a subframe n, i.e., the original (n+4) rule is used. In other words, the rule for receiving the other DCI in the licensed band may be different from that is used for the unlicensed band. In addition, the first transmission and the second transmission in the unlicensed band may be performed via a first cell of the network, and the third transmission and the fourth transmission in the licensed band may be performed via a second cell of the network. The first cell and the second cell may belong to (i.e., be controlled by) the same base station or different base stations of the network.

It should be noted that the UL transmissions defined in the current 3GPP standard belong to a synchronous transmission scheme. On the other hand, an asynchronous transmission scheme is provided for the UL transmission in the process 30. The asynchronous transmission may be configured by the network to the UE via a radio resource control (RRC) message (e.g., RRCConnectionReconfiguration) or a new UL DCI format.

In one example, the UE may receive a third DCI in another control channel (e.g., PDCCH) in another subframe of the unlicensed band, wherein the third DCI indicates that a next transmission is synchronous. That is, even if the UE has performed asynchronous transmissions in previous subframes, the network may change the type of the transmission to synchronous transmission for future subframes by using a DCI, i.e., the type of the transmission is overridden by the DCI.

In one example, the first subframe in the process 30 may be in an on duration of a discontinuous reception (DRX) cycle, the second subframe is in an off duration of the DRX cycle according to a DRX configuration. Then, the distance is equal to or larger than 4 subframes, and is smaller than a value. That is, the UE needs to wake up to receive the DCI in the off duration until a certain number of subframes (e.g., the value minus 1) has been passed. The number of subframes may be configured according to a message transmitted by the network, or may be predetermined according to a standard. A related example is as shown in FIG. 5.

Figure 4:
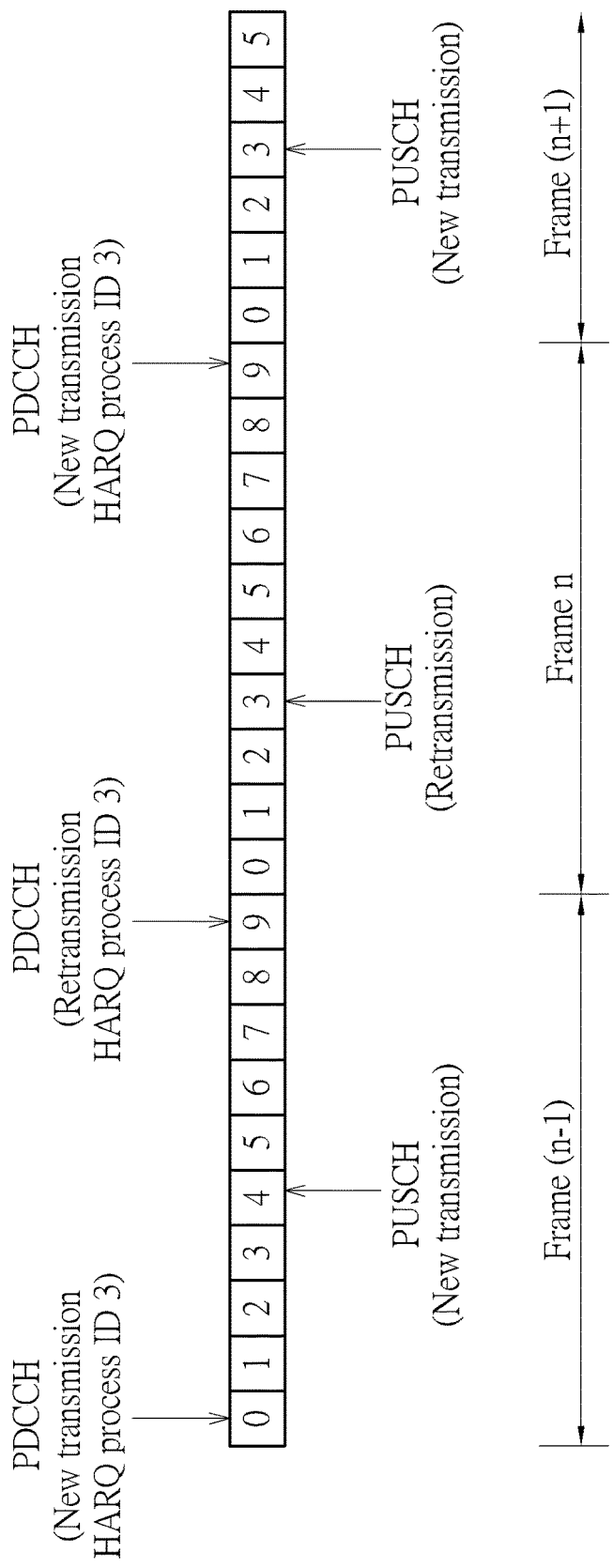
FIG. 4 is a schematic diagram of transmissions in an unlicensed band according to an example of the present invention.

FIG. 4 is a schematic diagram of transmissions in an unlicensed band according to an example of the present invention. As shown in FIG. 4, a UE receives a DCI in a PDCCH of a subframe 0 of a frame (n−1), and a new transmission associated with a HARQ process ID 3 is granted in the DCI. Accordingly, the UE performs the new transmission in a PUSCH of a subframe 4 of the frame (n−1). The network does not receive the transmission successfully, and transmits a DCI in the PDCCH of a subframe 9 of the frame (n−1) to indicate that the transmission is not successful. The DCI may include the HARQ process ID 3, a NDI indicating a retransmission, and/or a UL grant indicating a resource for performing the retransmission. A distance between the subframes of the new transmission and the DCI indicating the retransmission is 5 which is greater than 4. Then, the UE performs the retransmission in the PUSCH of a subframe 3 of a frame n according to the DCI (and the original (n+4) rule). The network receives the transmission successfully, and transmits a DCI in the PDCCH of a subframe 9 of the frame n to indicate another new transmission. The DCI may include the HARQ process ID 3, a NDI indicating the new transmission, and/or a UL grant indicating a resource for performing the new transmission. Again, a distance between the subframes of the retransmission and the DCI indicating the new transmission is 6 which is greater than 4. Then, the UE performs the new transmission in the PUSCH of a subframe 3 of a frame (n+1) according to the DCI (and the original (n+4) rule).

Figure 5:
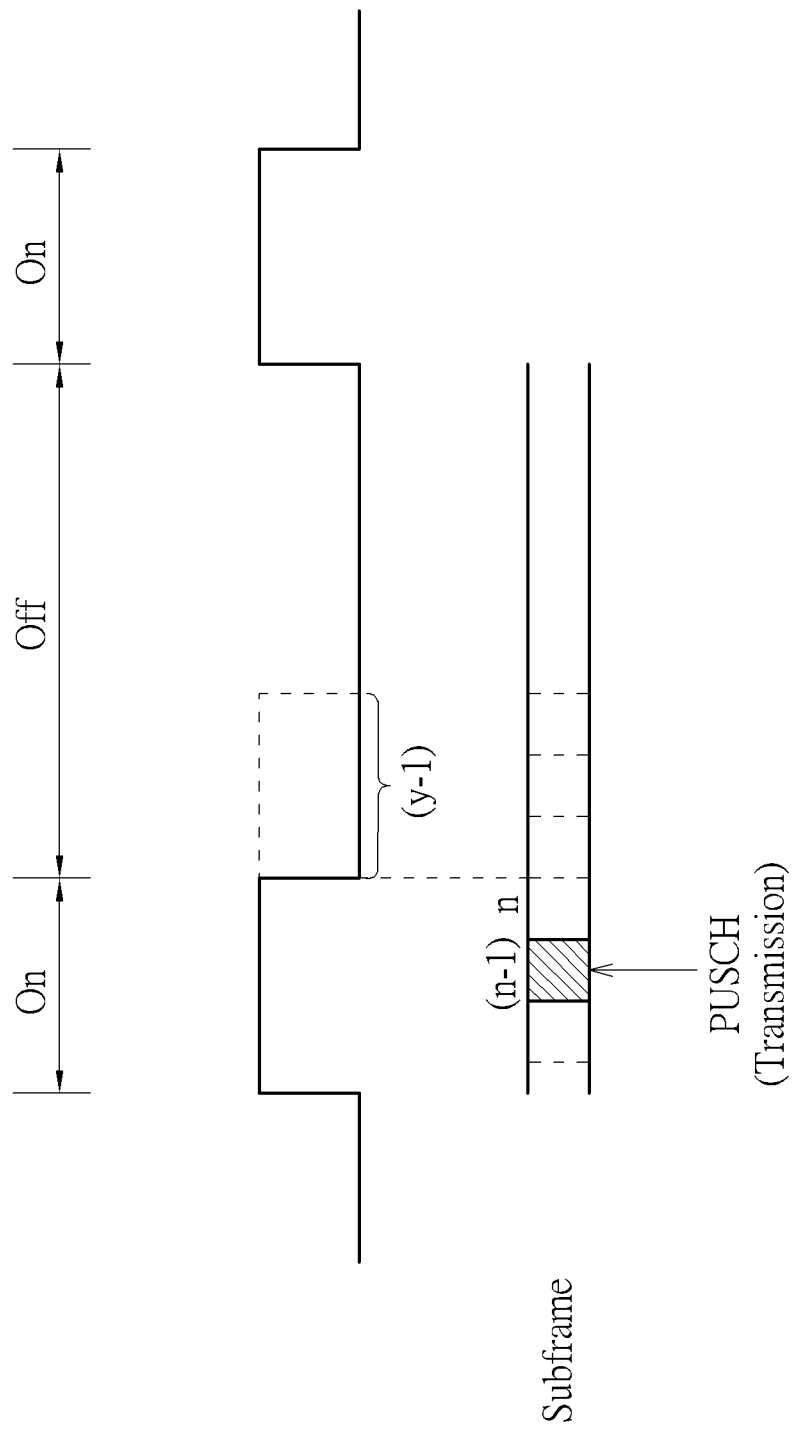
FIG. 5 is a schematic diagram of a transmission in an unlicensed band according to an example of the present invention.

FIG. 5 is a schematic diagram of a transmission in an unlicensed band according to an example of the present invention. As shown in FIG. 5, a UE performs a transmission (e.g., new transmission or retransmission) in a PUSCH of a subframe n. Then, the UE does not transfer to an off duration of a DRX cycle for subframes where the network may transmit a DCI in a subframe, even if the off duration configured by the network has been reached. The UE needs to wake up to receive a DCI from the network within (y−1) subframes in the off duration. That is, the UE needs to monitor a PDCCH for receiving (i.e., detecting) the DCI within y subframes after the subframe (n−1). The value y may be equal to or larger than 4, may be configured by the network, or may be predetermined in the 3GPP standard. The value y may be smaller than a value (e.g., the length of the off duration) so that a receiver of the UE may transfer to a sleep mode.

Figure 6:
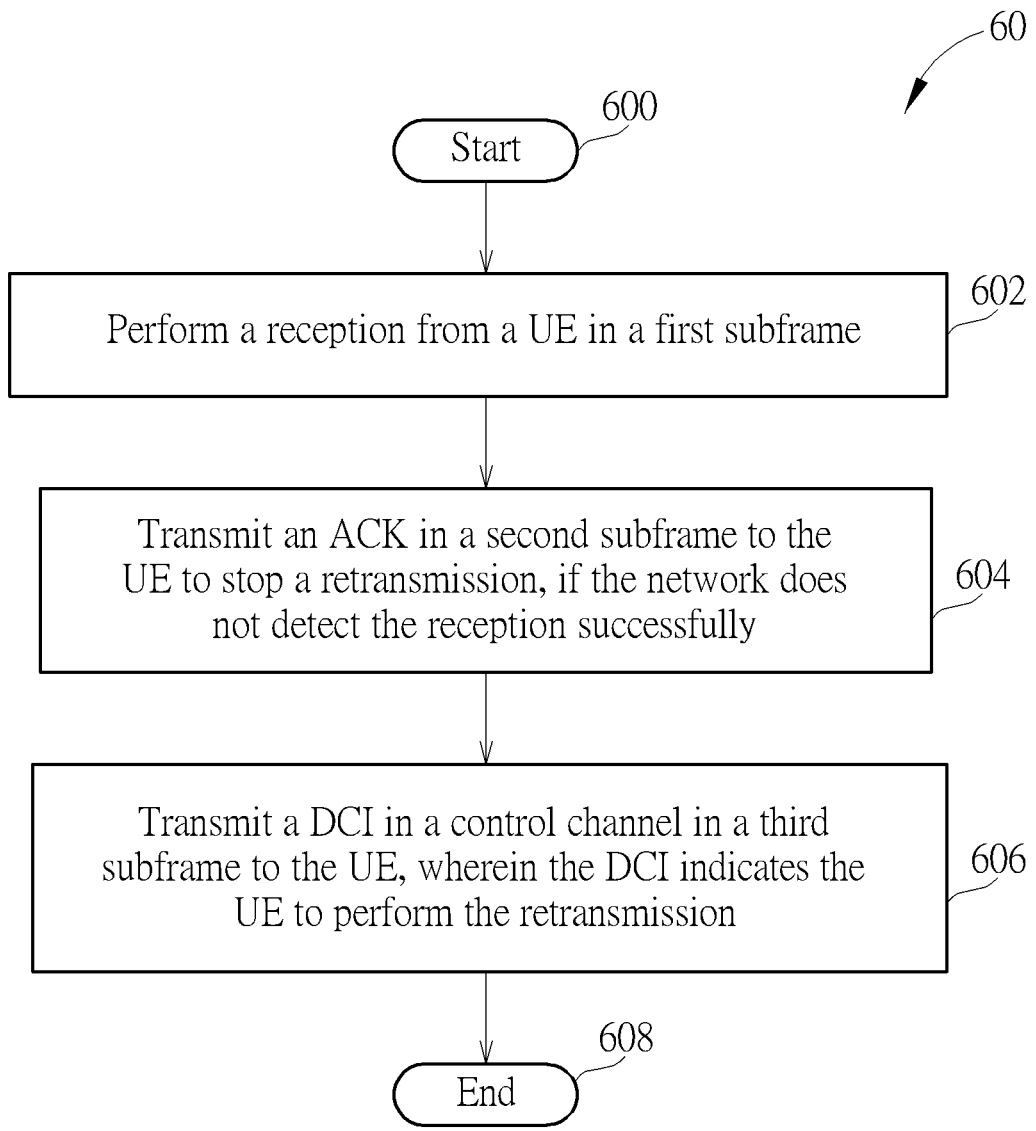
FIG. 6 is a flowchart of a process according to an example of the present invention.

FIG. 6 is a flowchart of a process 60 according to an example of the present invention. The process 60 may be utilized in the network shown in FIG. 1, to stop a retransmission. The process 60 may be compiled into the program code 214 and includes the following steps:

Step 600: Start.

Step 602: Perform a reception from a UE in a first subframe.

Step 604: Transmit an acknowledgement (ACK) in a second subframe to the UE to stop a retransmission, if the network does not detect the reception successfully.

Step 606: Transmit a DCI in a control channel in a third subframe to the UE, wherein the DCI indicates the UE to perform the retransmission.

Step 608: End.

According to the process 60, the network may perform a reception (e.g., a packet) from a UE in a first subframe. The network may transmit an acknowledgement (ACK) in a second subframe to the UE to stop a retransmission, if the network does not detect the reception successfully. Later, the network may transmit a DCI in a control channel in a third subframe to the UE, wherein the DCI indicates the UE to perform the retransmission, e.g., when the network determines that channel quality has become acceptable, e.g., above a certain threshold. That is, the network cheats the UE to stop the retransmission. Thus, a great number of unsuccessful retransmissions due to the channel quality can be avoided, and the UE will not abandon the HARQ process of the transmission due to that the number of unsuccessful retransmissions is greater than a limit. In addition, the retransmission can be resumed again, because the UE does not clear the buffer (i.e., data of the transmission is kept) after receiving the ACK. As a result, the HARQ process will not be passed to an upper protocol layer, and efficiency of the communication can be improved.

In one example, the first subframe, the second subframe and the third subframe may be in an unlicensed band. The transmission/receptions (e.g., the reception and the retransmission in the process 60) mentioned above may be synchronous transmission defined in the 3GPP standard. The synchronous transmission may be configured by the network to the UE via a RRC message (e.g., RRCConnectionReconfiguration) or a new UL DCI format.

Figure 7:
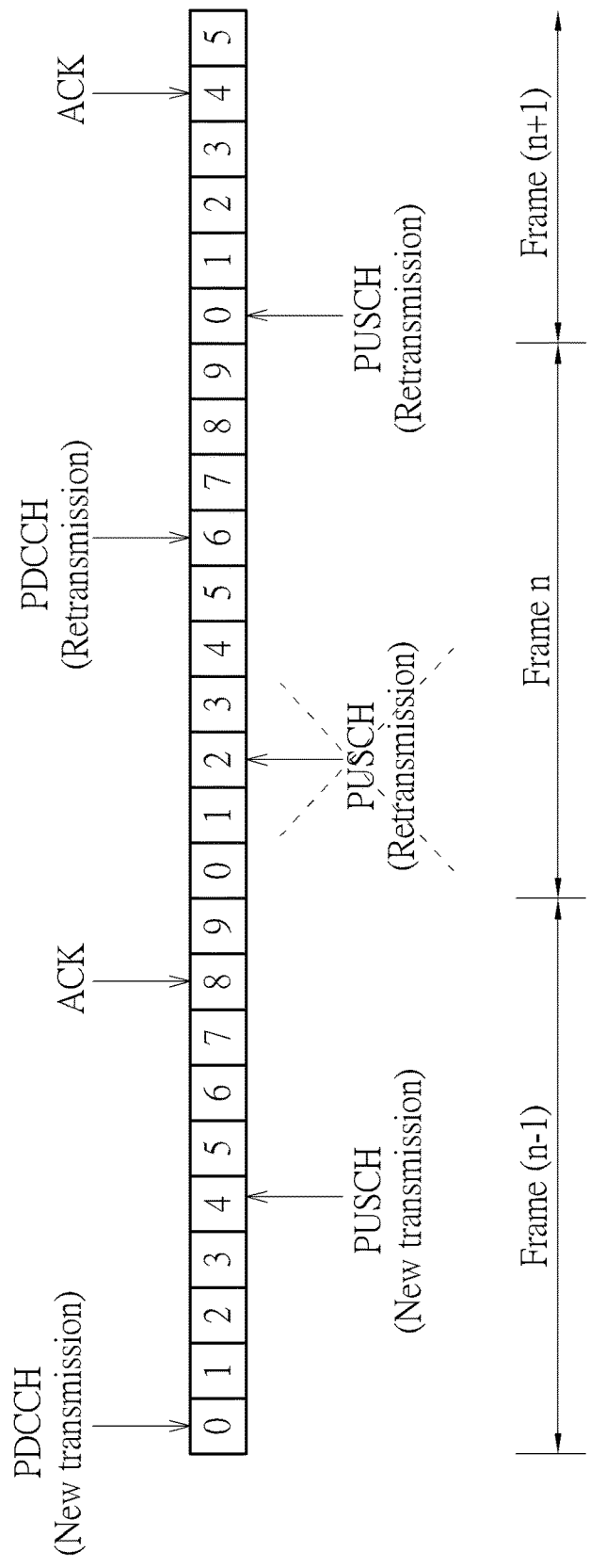
FIG. 7 is a schematic diagram of transmissions in an unlicensed band according to an example of the present invention.

FIG. 7 is a schematic diagram of transmissions in an unlicensed band according to an example of the present invention. As shown in FIG. 7, a UE receives a DCI in a PDCCH of a subframe 0 of a frame (n−1). Accordingly, the UE performs the new transmission in a PUSCH of a subframe 4 of the frame (n−1). The network does not receive the transmission successfully. However, the network transmits an ACK in the PDCCH of a subframe 8 of the frame (n−1) to stop a retransmission, e.g., due to unacceptable channel quality. The UE stops the retransmission in the PUSCH of a subframe 3 of a frame n according to the ACK (and the original (n+4) rule). Later, the network may determine that the channel quality has become acceptable, and transmits a DCI in the PDCCH of a subframe 6 of the frame n to request for a retransmission. The UE performs the retransmission in the PUSCH of a subframe 0 of a frame (n+1) according to the DCI (and the original (n+4) rule). The network receives the transmission successfully, and transmits another ACK in the PDCCH of a subframe 4 of the frame (n+1) to indicate another new transmission.

Figure 8:
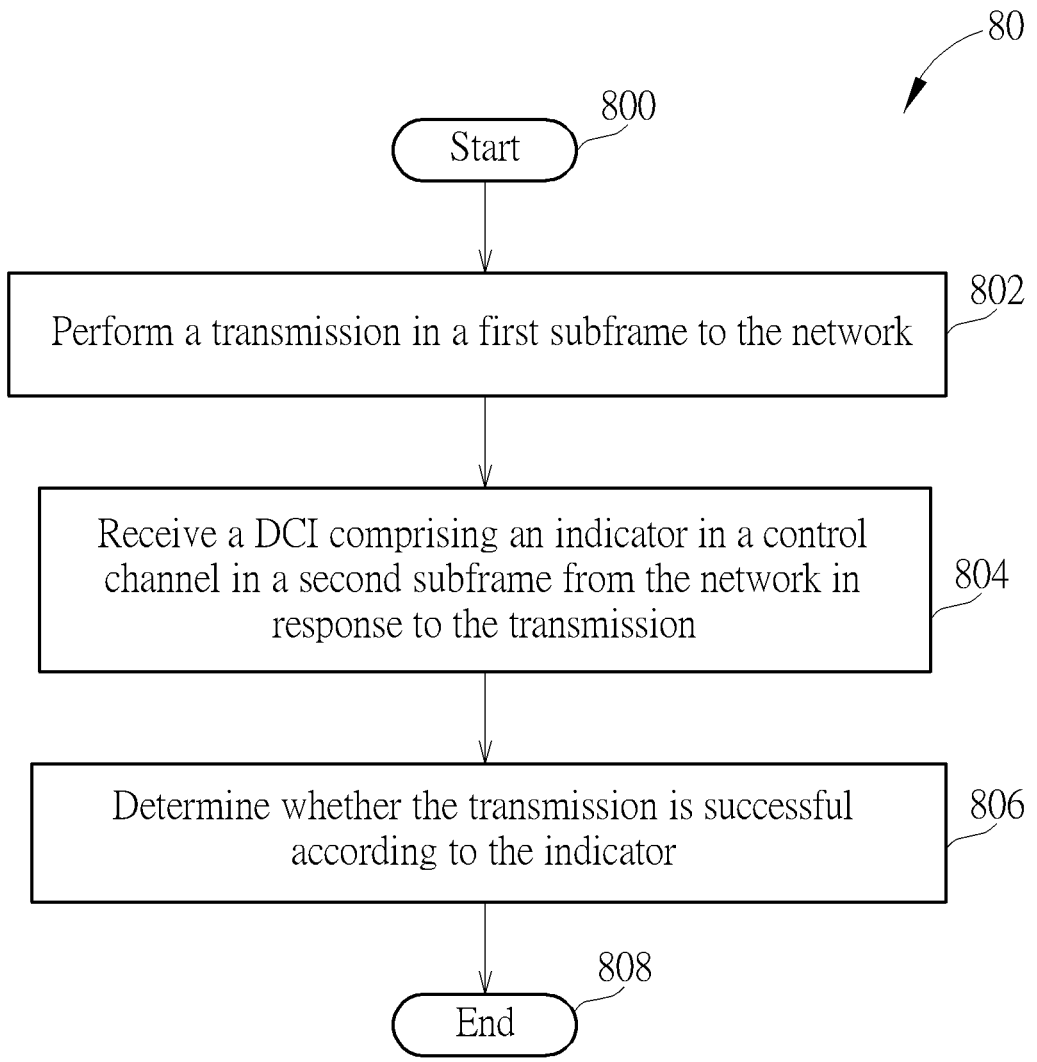
FIG. 8 is a flowchart of a process according to an example of the present invention.

FIG. 8 is a flowchart of a process 80 according to an example of the present invention. The process 80 may be utilized in a UE shown in FIG. 1, to recognize a DCI. The process 80 may be compiled into the program code 214 and includes the following steps:

Step 800: Start.

Step 802: Perform a transmission in a first subframe to the network.

Step 804: Receive a DCI comprising an indicator in a control channel in a second subframe from the network in response to the transmission.

Step 806: Determine whether the transmission is successful according to the indicator.

Step 808: End.

According to the process 80, the UE may perform a transmission in a first subframe to the network, and may receive a DCI comprising an indicator in a control channel in a second subframe from the network in response to the transmission. Then, the UE may determine whether the transmission is successful according to the indicator. That is, the indicator may be newly added in the DCI for indicating whether the transmission is successful or not. In contrast, according to the prior art, a NDI in the DCI only indicates a new transmission or a retransmission, and the UE cannot know whether the transmission is successful according to the NDI.

In one example, the UE in the process 80 may determine that the transmission is successful if the indicator is set to a first value (e.g., bit "1"), and may determine that the transmission is not successful if the indicator is set to a second value (e.g., bit "0"). That is, the network may use a single bit for indicating whether the transmission is successful. Further, the UE may determine that the transmission is successful and a new transmission is not allowed, if the indicator is set to the first value and a NDI is not toggled in the DCI. That is, the indicator and the NDI may be used together for indicating more information.

In one example, the first subframe and the second subframe in the process 80 may be in an unlicensed band. In one example, the retransmission may be a synchronous transmission defined in the 3GPP standard, or may be configured by the network to the UE via a RRC message (e.g., RRC-ConnectionReconfiguration) or a new UL DCI format.

Figure 9:
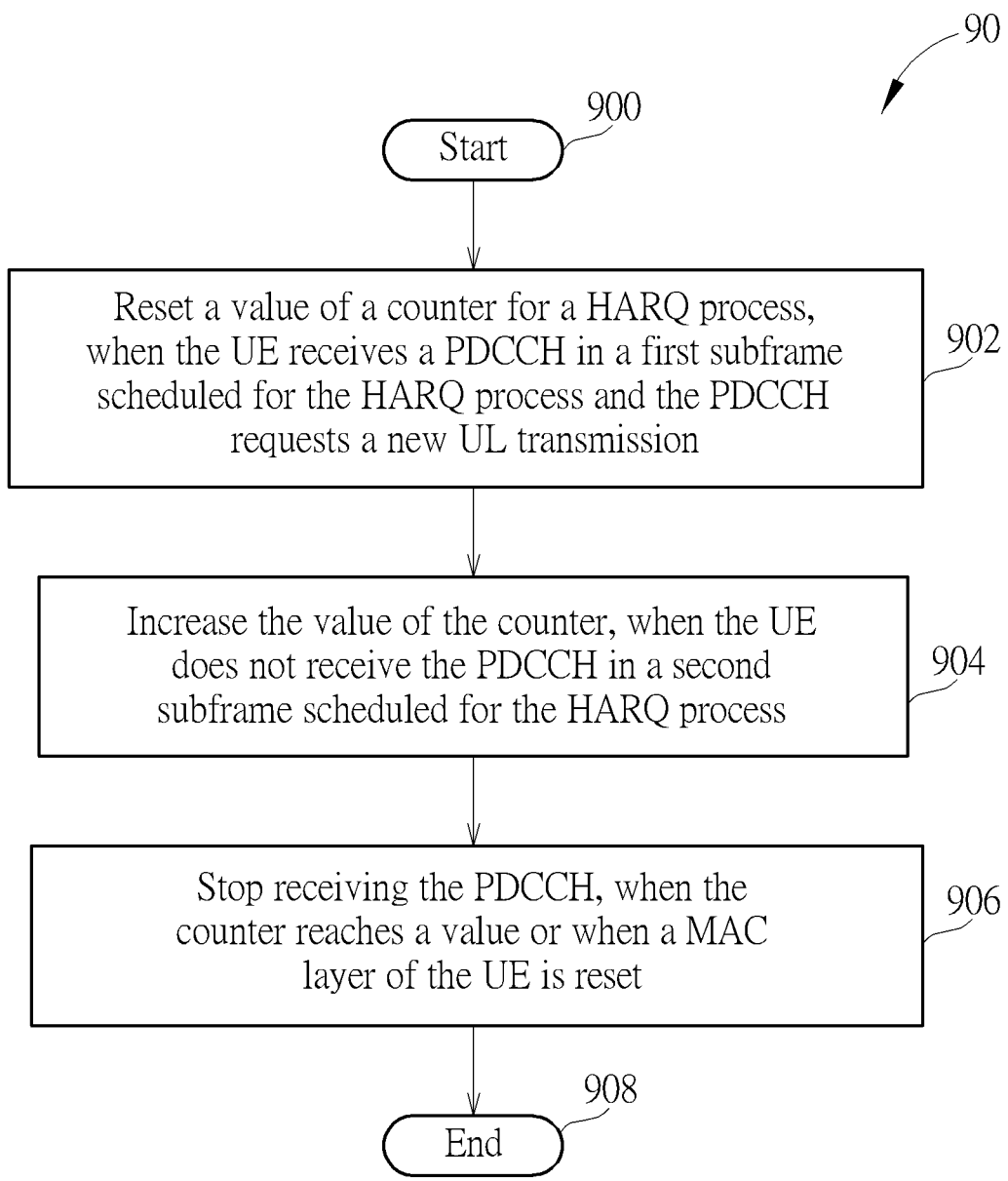
FIG. 9 is a flowchart of a process according to an example of the present invention.

FIG. 9 is a flowchart of a process 90 according to an example of the present invention. The process 90 may be utilized in a UE shown in FIG. 1, to receive a PDCCH in an unlicensed band. The process 90 may be compiled into the program code 214 and includes the following steps:

Step 900: Start.

Step 902: Reset a value of a counter for a HARQ process, when the UE receives a PDCCH in a first subframe scheduled for the HARQ process and the PDCCH requests a new UL transmission.

Step 904: Increase the value of the counter, when the UE does not receive the PDCCH in a second subframe scheduled for the HARQ process.

Step 906: Stop receiving the PDCCH, when the counter reaches a value or when a medium access control (MAC) layer of the UE is reset.

Step 908: End.

According to the process 90, the UE may reset a value of a counter for a HARQ process, when the UE receives a PDCCH in a first subframe scheduled for the HARQ process and the PDCCH requests a new UL transmission. The UE may increase the value of the counter, when the UE does not receive the PDCCH in a second subframe scheduled for the HARQ process. Then, the UE may stop receiving the PDCCH, when the counter reaches a value or when a MAC layer of the UE is reset. That is, the UE monitors the PDCCH, if one of the conditions is satisfied: the value is not reached and the MAC layer is not reset. Otherwise, the UE stops monitoring the PDCCH. In one example, the value (e.g., the maximum value) may be configured by the network (e.g., via a signalling). In another example, the value may be a predetermined value (e.g., specified in the 3GPP standard). Thus, power consumption of the UE can be reduced.

Figure 10:
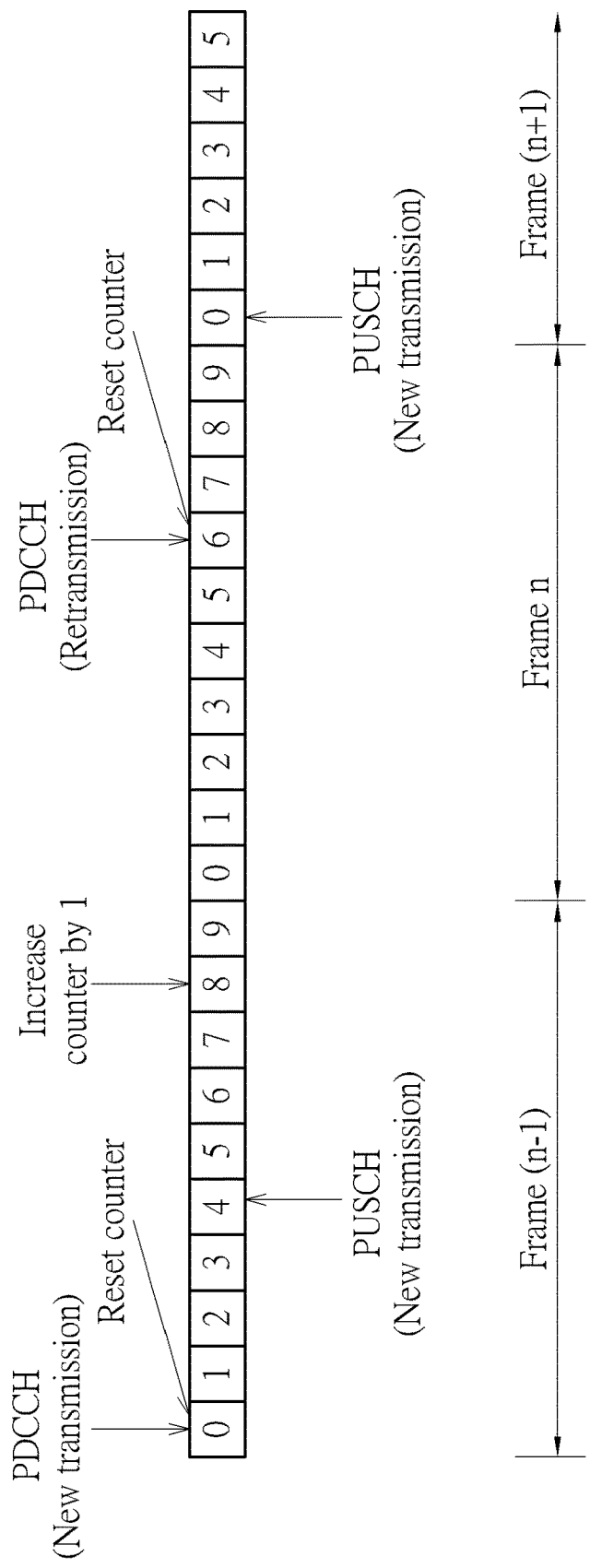
FIG. 10 is a schematic diagram of transmissions in an unlicensed band according to an example of the present invention.

FIG. 10 is a schematic diagram of transmissions in an unlicensed band according to an example of the present invention. As shown in FIG. 10, a UE receives a DCI in a PDCCH of a subframe 0 of a frame (n−1). Accordingly, the UE performs a new transmission in a PUSCH of a subframe 4 of the frame (n−1). The network does not receive the transmission successfully, and the network does not transmit a NACK in the PHICH of a subframe 8 of the frame (n−1) according to the original (n+4) rule. Accordingly, the UE increases a counter (e.g., by 1) for a HARQ process corresponding to the transmission. Note that according to the original (n+4) rule, the UE may not monitor the PDCCH in subframes 1-7 and 9 of the frame (n−1) and the PDCCH in subframes 0-5 of the frame n. The UE may monitor only the PDCCH of the subframe 8 of the frame (n−1) and a subframe 6 of the frame n. Later, the network may transmit a DCI in the PDCCH of the subframe 6 of the frame n to request for a retransmission. The UE resets the counter after receiving the DCI.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a method and a communication device for solving a transmission/reception of a HARQ feedback and the corresponding (re)transmission in an unlicensed band. Thus, the uncertainty of the unlicensed band can be overcome.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a transmission in an unlicensed band, comprising:
    a storage device for storing instructions of:
    performing a first transmission using a hybrid automatic repeat request (HARQ) process in a first subframe of an unlicensed band to a network;
    receiving a first downlink (DL) control information (DCI) for the HARQ process in a first control channel in a second subframe of the unlicensed band in response to the first transmission from the network, wherein a distance between the first subframe and the second subframe greater than four subframes; and
    performing a second transmission using the HARQ process in a third subframe of the unlicensed band to the network according to the first DCI; and
    a processing circuit, coupled to the storage device, configured to execute the instructions stored in the storage device.

2. The communication device of claim 1, wherein the first DCI comprises a HARQ process identification (ID) for identifying the HARQ process.

3. The communication device of claim 2, wherein the HARQ process ID is indicated by a field of the first DCI with a new uplink (UL) DCI format, or is indicated by at least one bit of the first DCI with an existent DCI format.

4. The communication device of claim 1, wherein the distance is configured by the network, or is a predetermined value.

5. The communication device of claim 1, wherein the first transmission is performed via a physical UL shared channel (PUSCH) of the first subframe, and the second transmission is performed via a PUSCH of the third subframe.

6. The communication device of claim 1, wherein the storage device further stores the instruction of:
    performing a third transmission using another HARQ process in a fourth subframe of a licensed band to the network; and
    receiving a second DCI for the another process in a second control channel in a fifth subframe of the licensed band from the network in response to the third transmission, wherein a distance between the fourth subframe and the fifth subframe is four subframes;
    performing a fourth transmission using the another process in a sixth subframe of the licensed band to the network according to the second DCI.

7. The communication device of claim 6, wherein the first transmission and the second transmission in the unlicensed band are performed via a first cell of the network, and the third transmission and the fourth transmission in the licensed band are performed via a second cell of the network.

8. The communication device of claim 7, wherein the first cell and the second cell belong to the same base station or different base stations of the network.

9. The communication device of claim 1, wherein the storage device further stores the instruction of:
    receiving a third DCI in a third control channel in a seventh subframe of the unlicensed band, wherein the third DCI indicates that a next transmission is synchronous.

10. The communication device of claim 1, wherein the first subframe is in an on duration of a discontinuous reception (DRX) cycle, the second subframe is in an off duration of the DRX cycle, and the distance is configured according to a message transmitted by the network, or is predetermined.

11. A network for stopping a retransmission, comprising:
    a storage device for storing instructions of:
    performing a reception from a communication device in a first subframe;
    transmitting an acknowledgement (ACK) in a second subframe to the communication device to stop a retransmission, if the network does not detect the reception successfully; and
    transmitting a downlink (DL) control information (DCI) in a control channel in a third subframe to the communication device, wherein the DCI indicates the communication device to perform the retransmission; and
    a processing circuit, coupled to the storage device, configured to execute the instructions stored in the storage device.

12. A communication device for recognizing a downlink (DL) control information (DCI), comprising:
    a storage device for storing instructions of:
    performing a transmission in a first subframe to a network;

receiving a downlink (DL) control information (DCI) comprising an indicator in a control channel in a second subframe from the network in response to the transmission; and determining whether the transmission is successful according to the indicator; and a processing circuit, coupled to the storage device, configured to execute the instructions stored in the storage device.

13. The communication device of claim 12, wherein the instruction of determining whether the transmission is successful according to the indicator comprise:

determining that the transmission is successful, if the indicator is set to a first value; and determining that the transmission is not successful, if the indicator is set to a second value.

14. The communication device of claim 13, wherein the storage device further stores the instruction of:

determining that the transmission is successful and a new transmission is not allowed, if the indicator is set to the first value and a new data indicator (NDI) is not toggled in the DCI.

15. A communication device for receiving a physical downlink (DL) control channel (PDCCH) in an unlicensed band, comprising:

a storage device for storing instructions of:

resetting a value of a counter for a hybrid automatic repeat request (HARQ) process, when the communication device receives a PDCCH in a first subframe scheduled for the HARQ process and the PDCCH requests a new uplink (UL) transmission;

increasing the value of the counter, when the communication device does not receive the PDCCH in a second subframe scheduled for the HARQ process; and stopping receiving the PDCCH, when the counter reaches a value or when a medium access control (MAC) layer of the communication device is reset; and a processing circuit, coupled to the storage device, configured to execute the instructions stored in the storage device.

16. The communication device of claim 15, wherein the value is configured by the network, or is a predetermined value.

\* \* \* \* \*